July 9, 1957
L. W. TRACY
2,798,621
SELF-LOADING VEHICLE
Filed July 21, 1955
2 Sheets-Sheet 1
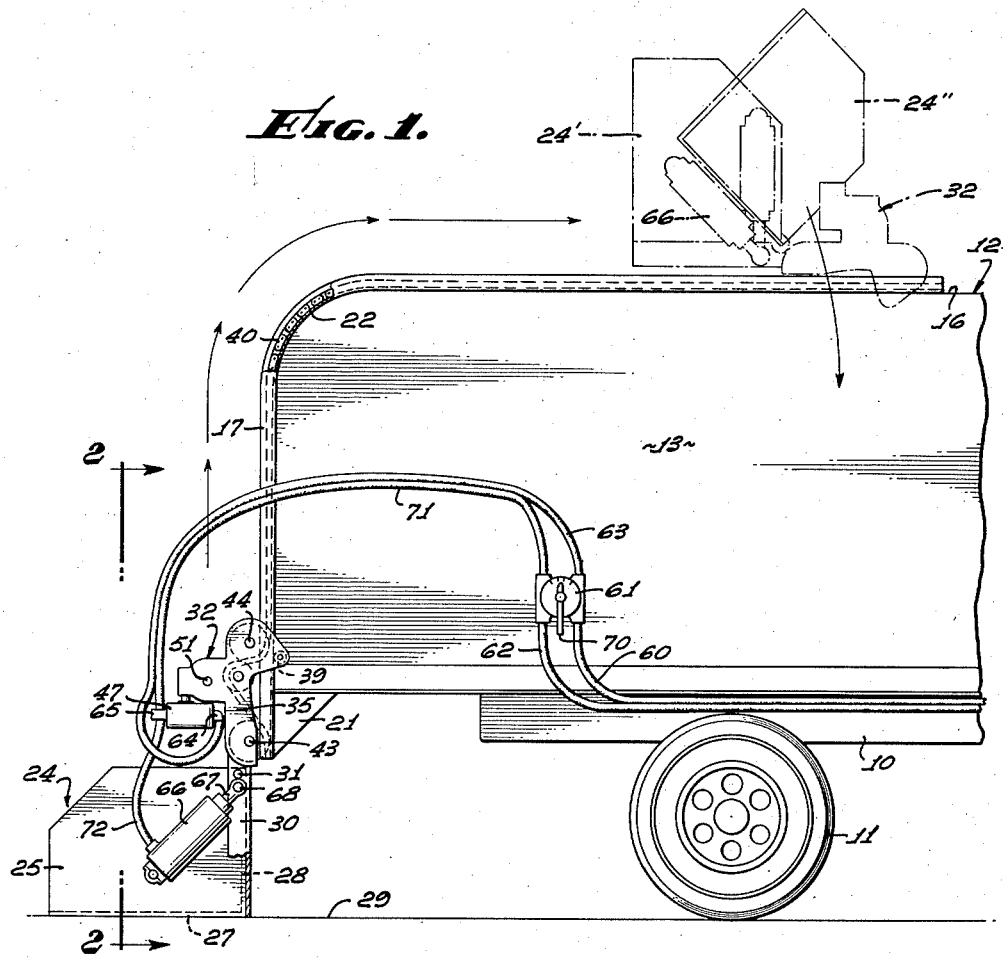
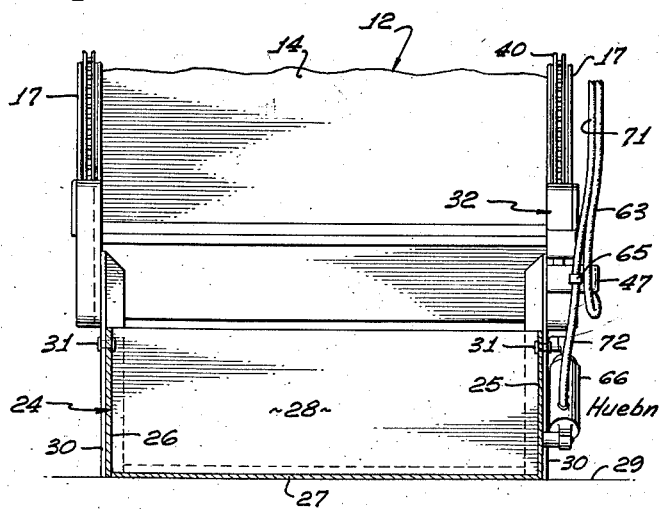
LESLIE W. TRACY
INVENTOR.
Huebner, Beehler, Worrel & Herzig
BY
ATTORNEYS.

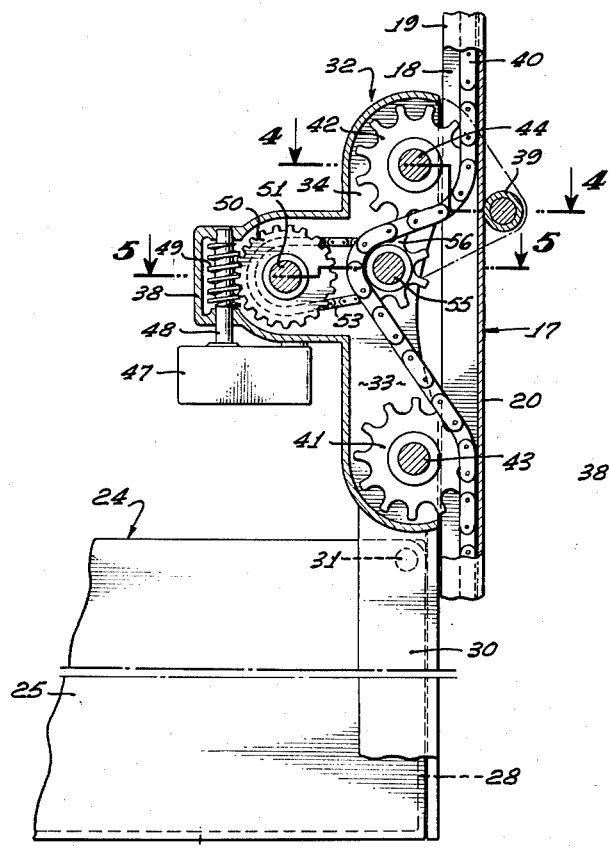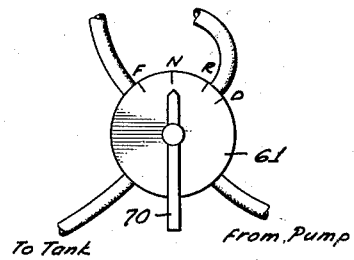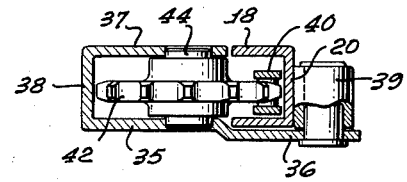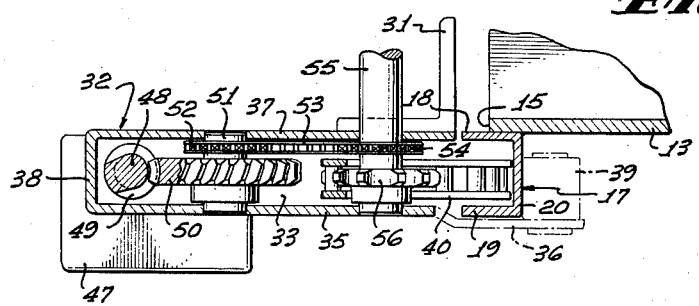

United States Patent Office 2,798,621
Patented July 9, 1957

2,798,621

SELF-LOADING VEHICLE

Leslie W. Tracy, Los Angeles, Calif.

Application July 21, 1955, Serial No. 523,595

7 Claims. (Cl. 214—75)

The invention relates to a power device for elevating a dump bucket along a track and has particular reference to adaptation of the power operated dump bucket to a mobile receptacle into which the bucket can be periodically dumped. Devices of the type described find frequent use in such vehicles as trash pick-up devices, garbage trucks, and the like.

The time-honored system for picking up accumulations of trash and garbage has been a truck provided along the sides with platforms upon which attendants can step in order to reach over the high side of the receptacle to dump trash into it. Substitutions for the hand dumping have been made which have taken the form of buckets secured to the truck chassis or truck body by long lever arms and powered in such fashion that the bucket can be lifted on the arms over the top of the receptacle and there dumped periodically as the bucket is filled. While these mechanical devices have been successful in eliminating the disadvantages of hand dumping, they have certain disadvantages in cost and in the weight involved in the bucket and arm structure alone independently of the weight of the load. Hence there has been a practical limit to the size of such devices and the loads which they are able to handle. As trucks and truck bodies are built larger with receptacles on them of increasingly large capacity, it has become desirable to be able to quickly and effectively fill the receptacle on the truck by operation of a dump bucket which moves quickly and smoothly to dumping position and which can be raised or lowered either while the truck is still or in motion.

Among the objects of the invention is to provide a new and improved roadable collection vehicle including a power actuated loading bucket capable of easy and accurate manipulation into a proper position with respect to a large receptacle into which it is capable of dumping at will and thereafter smoothly returned to an initial loading position whether or not the vehicle might be in motion.

Another object of the invention is to provide a new and improved mobile collector vehicle of large capacity equipped with a power-operated collecting bucket mounted upon the vehicle on tracks capable of transporting the bucket to a dump position, the tracks being of such character that traction elements on the bucket are capable of grasping the track in any position and clinging to the track while the bucket is being moved from one place to another.

Still another object of the invention is to provide a new and improved mobile accumulator vehicle wherein a collection and dump bucket is mounted upon the body of the vehicle and there actuated by a pair of hydraulic motors coupled with a dump motor, the motors being interconnected in such fashion that both forward and reverse operations of the mechanism can be controlled by an appropriate valve in a single hydraulic supply and return line combination.

Still another object of the invention is to provide a new and improved traction device by means of which an accumulating bucket can be fastened to a track in such fashion that positive traction is assured at all times without detriment to freedom of motion of the bucket along the track under the impetus of hydraulic power.

Still further among the objects of the invention is to provide a new and improved sprocket and link chain traction assembly by means of which a carriage or bucket is provided positive traction at all times whether travelling in a vertical or horizontal direction, power means for the traction being one capable of interconnection with an auxiliary hydraulic ram employed for dumping purposes in such fashion that a single hydraulic supply and return line is sufficient for all operations.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view of the rear portion of an accumulator vehicle showing the attachment of the bucket thereto and showing the bucket in successive elevated and dumping locations in broken line view.

Figure 2 is a vertical sectional view on the line 2—2 of Figure 1.

Figure 3 is a vertical sectional view taken through one of the hydraulic traction devices.

Figure 4 is a cross-sectional view taken on the line 4—4 of Figure 3.

Figure 5 is a cross-sectional view taken on the line 5—5 of Figure 3.

Figure 6 is an enlarged detailed view of the hydraulic control valve.

In an embodiment chosen for the pupose of illustration there is shown the rear portion of a truck which includes a chassis or frame 10, wheels 11, and a receptacle in the form of a truck body 12 having side walls 13 and a rear wall 14. Each side wall has a rear vertical edge 15 and a substantially horizontal upper edge 16. On each of the side walls there is provided a track 17 which is channel-shaped having an inside leg 18, an outside leg 19, and a web 20 forming the bottom. It will be noted that the track is secured to the outer surface of the edge of the side wall as by welding, exposing both the outside and the inside of the web or bottom 20. The track extends upwardly from a location somewhat below the body where it is supported by a brace 21 around a curved junction 22 of the upright and horizontal edges and thence forwardly over substantially the entire horizontal upper edge of the respective side wall.

A bucket 24 is shown in Figures 1 and 2 in loading position. The bucket has side walls 25 and 26 a transverse wall 27, which in Figures 1 and 2 is shown resting upon the ground surface 29, and a transverse wall 28 which in Figures 1 and 2 is shown in vertical position. The bucket constructed in this fashion is open at two sides, namely, the side facing the rear, as illustrated in Figures 1 and 2, and the side facing upwardly.

To secure and to motivate the bucket there is provided for each side of the bucket an arm 30 which extends along the outside of the respective side wall adjacent the forward edge as viewed in Figure 1. The arm pivotally mounts the bucket thereon by means of a pivot pin 31.

A housing 32 is attached to the arm 30 as by means of welding and forms in effect an extension of the arm. Inside the housing is a traction sprocket chamber 33 and a second smaller chamber 34 adjoining the chamber 33. Forming the housing is an outer side wall 35 which has a portion 36 overlying the exposed or outside edge of the track 17. An inner side wall 37 is parallel to the outer side wall and a connecting plate 38 joins the two. On the portion 36 is mounted a roller 39 so positioned that it is adapted to roll on the adjacent side or bottom 20 of the web. By this device the housing and consequently the bucket is prevented from pulling away from the tracks on opposite sides of the vehicle.

Lying in the track is a chain 40 comprising appropriate links adapted to mesh with and engage traction sprockets 41 and 42. The chain is anchored by suitable means at its opposite ends to the track. Sprockets 41 and 42 are freely rotatable about their respective shafts 43 and 44, these shafts being mounted in the side walls of the housing 32.

To propel the housings and consequently the bucket 24 upwardly from the initial position shown in Figure 1 to discharge position as shown in dotted lines at the top of Figure 1, there is provided a hydraulic reversible motor 47 from which a motor shaft 48 extends into the casing wherein it is equipped with a worm wheel 49. The worm wheel meshes with a gear 50 mounted upon a shaft 51 in the chamber 34 of the housing. The gear is keyed to the shaft by appropriate keying means and on the same shaft is a sprocket 52 likewise keyed to the shaft. A short drive chain 53 supplies a drive from the sprocket 52 to a driven sprocket 54. The driven sprocket is keyed to a short shaft 55 upon which also is keyed a power sprocket 56, the last identified sprocket being applied to the underside of the chain 40 so that, the chain being sufficiently loose, the chain is made to pass under the traction sprockets 42 and 43 and is looped over the power sprocket 56. In this fashion the housings and the bucket attached therebetween becomes firmly secured to the chains in the tracks. Mounted in this fashion the housing can ride up along the upright portion of the track, then follow the curved portion 22 and finally follow along the substantially horizontal portion of the track at the top of the vehicle.

To drive the hydraulic motor 47, a hydraulic power line 60 is taken from an appropriate hydraulic power source on the vehicle and conducted through a four-way hydraulic control valve and restricter 61. A hydraulic return line 62 is connected from the valve 61 to an appropriate tank on the vehicle. From the valve 61 is a hydraulic line 63 by means of which hydraulic liquid under pressure may be conducted first to a fitting 64 on the motor 47, and thereafter by employment of a short line 65 the liquid under pressure is conducted into one end of a hydraulic ram 66. Following conventional practice the ram 66 may be provided with a suitable spring return acting in a direction against the application of hydraulic power through the line 65. The hydraulic ram has a piston rod 67 extending therefrom and the piston rod is attached by means of a pin 68 pivotally upon the respective arm 30. It should be noted that there is only one hydraulic supply line and a single hydraulic return line which is employed to accomplish all of the adjustments for operation of both motors.

When the vehicle is ready for operation the bucket 24 is lowered to the position shown in Figures 1 and 2. In that position the bucket may rest on the supporting surface 29 or be elevated a very slight distance therefrom by location of the housing 32 at the bottom of its line of travel. In that position the bucket may be filled with debris, garbage, trash, dirt, sand, gravel, or anything which it may be planned to transport in the vehicle. When the bucket is full, a handle 70 on the four-way hydraulic valve is moved from the neutral position shown to forward position indicated by the letter F. Movement of the handle to that position causes hydraulic liquid under pressure from the hydraulic power line 60 to pass through the valve into the hydraulic line 63 which carries it to one port of the reversible rotary hydraulic motor 47. The hydraulic liquid under pressure passes through the motor in a direction from the fitting 64 through the motor in a forward acting direction to a fitting 65 on the opposite side. As a result of passing liquid under pressure through the motor, the shaft 48 is caused to rotate, in turn rotating the worm wheel 49, the worm gear 50, shaft 51, and ultimately the sprocket 56. As the sprocket rotates in a counterclockwise direction, the bucket will be elevated. Power may continually be supplied until the bucket occupies the broken line position 24' of Figure 1. After the bucket has reached its desired position, it may be stopped by setting the handle 70 at the position N. To cause the bucket to dump, the handle 70 is moved to D position. In that position hydraulic liquid under pressure continues to flow into the hydraulic line 63 but is stopped from passing back through the valve 61. This results in a build-up in pressure in a section 72 of the hydraulic line which is connected to the ram 66. Hydraulic liquid under pressure entering the ram causes the rod 67 to extend itself against the pin 68 which fastens the piston rod to the respective arm. Since this last identified pin remains stationary, the body of the ram being pivotally secured to the bucket by means of a pin 73 in each case, causes the bucket to be lifted to a dotted line position 24", illustrated in Figure 1, in which position the contents of the bucket will be emptied into the top of the receptacle 13 of the truck body. When hydraulic pressure employed in this manner is relieved, a suitable spring, previously mentioned, within the ram will return the piston rod 67 to its initial retracted position and the bucket will be returned to its initial position.

To reverse action of the motor 47 and incidentally to expedite return of the bucket to initial position, the handle 70 of the valve is moved to R position meaning reverse. In this position hydraulic liquid under pressure from the power line 60 is diverted through the valve 61 to the return line 71 which then becomes a supply line. On the other hand, the hydraulic line 63 becomes a return line so that liquid passing from it goes through the valve 61 to the return line 62. Rotation of the handle in the last described manner releases pressure in the line 72 and enables the spring in the ram to do its work. At the same time this reversal of the flow of hydraulic liquid through the hydraulic lines is accompanied by a flow of hydraulic liquid from a fitting 65 through the motor to a fitting 64 from which it travels through the return line 71 to the valve 61, whereafter the valve 61 redirects the returning liquid into the return line 62. The motor will then continue to move the bucket in a return direction until it again rests on the surface 29 where a suitable stop may be provided or upon the bucket reaching that location the valve handle 70 may be shifted to neutral position. In that position hydraulic liquid under pressure supplied through the line 60 is by-passed back through the return line 62 until the next manipulation of the box needs to take place. The cycle is again repeated in the same fashion as has already been described.

As described herein a single hydraulic power line and a single hydraulic return line provide a complete means through the agency of the valve 61 to both advance and retract the rotary hydraulic motor for lifting the bucket to dump position and returning it therefrom and at the same time provide hydraulic power for dumping, from which position the bucket can be returned automatically to its initial position. A simple, compact and positive-acting device has thus been described securely anchored to a flexible portion of the track, namely, the chain. The arrangement of parts and particularly the driving parts and the location as shown of the hydraulic ram for dumping results in a smooth-working, positive-acting bucket in combination with a motor vehicle having a suitable receptacle thereon to permit use of the device under a great variety of conditions and for a great variety of different sized units.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A mobile accumulator comprising a vehicle, a frame, a receptacle on the frame having side walls, said side walls having upright rear edges and horizontal top edges with a curved junction therebetween, a continuous track on at least one side wall extending from the bottom of the rear edge around said curved junction to the fore part of the top edge and projecting laterally outwardly thereby to provide an underlying track throughout the length, a bucket movable between a loading location at the bottom of said rear edge and a discharge location adjacent the top edge and having an opening at the rear and at the top in said loading location, an arm assembly pivotally secured at one end thereof to the bucket and overlying the track, a roller on the arm assembly underlying the track, a chain lying in the track and secured at the ends, a pair of fore and aft traction sprockets on the arm assembly meshing with the chain, a rotatable shaft on the arm assembly and a power sprocket on the shaft between the traction sprockets underlying and meshing with the chain, a reversible motor on the arm assembly and a drive from said motor to the power sprocket adapted to move said bucket along the track from said loading location to a discharge location along the horizontal edges, dumping means pivotally connected between the bucket and the arm, and a manual control adapted to operate said motor and said dumping means.

2. A mobile accumulator comprising a vehicle, a frame, a receptacle on the frame having side walls, said side walls each having a rear edge and a top edge with a curved junction therebetween, a continuous track extending from the bottom of the rear edge around the curved junction to the fore part of the top edge and projecting laterally outwardly thereby to present a continuous trackway on the wider side, a bucket movable between a loading location adjacent the bottom of the rear edge to a discharge location adjacent the top edge, an arm assembly pivotally secured at one end to the bucket at each side and having another end overlying the track, a roller on each arm assembly underlying the track, a chain on the track secured at the ends, side portions on said track lying on opposite sides of the chain and adapted to retain said chain on the track, a pair of fore and aft traction sprockets on the arm assembly meshing with the chain and overlying the track on opposite fore and aft sides of said roller, a power sprocket on the arm assembly between the traction sprockets and underlying and meshing with the chain, a reversible motor on the arm assembly and a drive from said motor to the power sprocket adapted to move said bucket along the track from said loading location to said discharge location, a hydraulic ram pivotally connected between the bucket and the respective arm along a line removed from the connection of the arm with the bucket and adapted to dump said bucket, and controls respectively to the motor and the ram adapted to operate said ram and said motor.

3. A mobile accumulator comprising a vehicle, a frame extending rearwardly of the vehicle, a receptable on the frame having opposite side walls, said side walls each having an upright rear edge and a substantially horizontal top edge with a curved junction therebetween, a continuous channel-shaped track extending from the bottom of the rear edge to the fore part of the top edge and projecting laterally outwardly therefrom, a bucket having side walls, a transverse wall between the side walls adapted to assume a horizontal position when the bucket is lowered in loading location and a second transverse wall adapted to assume an upright position in said loading location whereby said bucket is open at the rear and at the top in said loading location, an arm pivotally secured to each side of the bucket and overlying the track, a sprocket casing, a roller on the casing underlying the track, a chain lying in the track and secured at each end, a pair of fore and aft traction sprockets in the casing meshing with the outside face of the chain, a shaft in the casing and power sprocket thereon between the traction sprockets underlying and meshing with the chain, a reversible hydraulic motor on the casing arm and a combined worm and chain drive from said motor to the power sprocket adapted to move said bucket along the track from said loading location to a discharge location along the horizontal edges, a hydraulic ram pivotally connected between each side wall and the respective arm, a hydraulic line to the motor and the ram and a manual control in said line adapted to operate said motor and said ram whereby to move said bucket to a selected location above the receptacle and to dump the bucket at said location.

4. A drive for a carriage comprising a track having opposite upper and lower sides and a lateral edge exposed, a link chain on one of said sides, a carriage, an arm assembly pivotally secured to the carriage, a member of said arm assembly overlying said edge, a roller on said member having a rolling engagement with the other of said sides of the track, fore and aft traction sprockets rotatably mounted on the arm assembly and meshing with the chain adjacent the track, a power sprocket on the arm assembly underlying and meshing with the chain intermediate the traction sprockets whereby the chain extends under the traction sprockets and over the power sprocket, a reversible motor on the arm assembly and a drive from said motor to said power sprocket.

5. A drive for a bucket comprising a track having one lateral edge anchored and having opposite upper and lower sides and the other lateral edge exposed, a link chain on the upper side, a bucket, an arm having a pivotal connection to the bucket, a casing on the arm having a side wall overlying said exposed edge, a roller on said side wall having a rolling engagement with the lower side of the track, fore and aft traction sprockets rotatably mounted on the casing and meshing with the chain adjacent the track, a power sprocket on the casing underlying and meshing with the chain intermediate the traction sprockets whereby the chain extends under the traction sprockets and over the power sprocket, a shaft on the power sprocket rotatably mounted in the casing, a driven sprocket on said shaft, a drive shaft on the casing, a chain drive from the drive shaft to the driven shaft, a reversible hydraulic motor on the housing and a worm drive from said motor to said drive shaft.

6. A drive for a bucket comprising a track having opposite upper and lower sides and having one lateral edge anchored and the other lateral edge exposed, a link chain secured at opposite ends on the upper side of the track, a bucket, a carriage comprising an arm, a pivotal connection between the arm and a lower corner of the bucket, a casing comprising part of said carriage and having a side wall overlying said exposed edge of the track, a roller on said side wall having a rolling engagement with the lower side of the track, fore and aft traction sprockets rotatably mounted on the casing and meshing with the chain adjacent the track, a power sprocket on the casing underlying and meshing with the chain intermediate the traction sprockets whereby the chain extends under the traction sprockets and over the power sprocket, a shaft on the power sprocket rotatably mounted in the carriage, a driven element on said shaft, a drive shaft on the casing, a drive train from the drive shaft to the driven shaft, a reversible hydraulic motor on the housing, a speed reducing drive from said motor to said drive shaft, and an extensible power member pivotally secured to the bucket and to the arm at a location offset with respect to the pivotal connection between the bucket and the arm and subject to operation for tilting said bucket.

7. A mobile accumulator comprising a vehicle, a frame thereon, a receptacle on the frame having side walls, said side walls having a rear upstanding edge and a top edge with a curved junction therebetween, a continuous track extending from the bottom of each rear edge around the curved junction to the fore-part of the top edge, said track having upper and lower sides projecting laterally outwardly of the respective side wall, a carriage on the track, a roller on the carriage in rolling engagement with the lower side of the track, a pair of fore and aft rollers on each side of the carriage in rolling engagement with the upper side of the respective track and means on said track adapted to retain said last rollers on the track, said carriage in loading position being at the bottom of the rear edges, a bucket removed from the carriage and adapted to rest on the ground in loading position at a location between the bottom of said rear edges and the ground, said bucket in loading position having a rear side open and a top side open, end walls on said bucket, an arm on each carriage pivotally connected to said bucket adjacent a front edge of the respective end wall and extending upwardly in loading position to said carriage, at least one hydraulic ram pivotally connected at one end to one of the arms at a location removed from the pivot and at the other end to said bucket along an oblique axis, power means connected between the carriage and the receptacle adapted to move said carriage along the tracks accompanied by said bucket, and a control means on the vehicle for said hydraulic cylinder and for said power means.

References Cited in the file of this patent

UNITED STATES PATENTS

| | | |
|---|---|---|
| 1,943,398 | Sargent | Jan. 16, 1934 |
| 1,945,533 | Lima | Feb. 6, 1934 |
| 2,703,227 | Hughes | Mar. 1, 1955 |
| 2,711,262 | Bing | June 21, 1955 |

FOREIGN PATENTS

| | | |
|---|---|---|
| 1,057,530 | France | Oct. 28, 1954 |